United States Patent
Luo et al.

(10) Patent No.: US 7,973,260 B2
(45) Date of Patent: Jul. 5, 2011

(54) WIRE ELECTRICAL DISCHARGE MACHINING

(75) Inventors: Tzuo-Liang Luo, Hsinchu (TW);
Chin-Mou Hsu, Taichung (TW);
En-Sheng Chang, Taichung (TW);
Ching-Yuan Lin, Taichung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 756 days.

(21) Appl. No.: 12/100,133

(22) Filed: Apr. 9, 2008

(65) Prior Publication Data

US 2009/0194511 A1      Aug. 6, 2009

(30) Foreign Application Priority Data

Feb. 1, 2008   (TW) .............................. 97103876 A

(51) Int. Cl.
*B23H 7/02*        (2006.01)
(52) U.S. Cl. .................................................. 219/69.12
(58) Field of Classification Search ............... 219/69.11, 219/69.12, 69.14, 69.2; 204/206, 224 M
See application file for complete search history.

(56) References Cited

U.S. PATENT DOCUMENTS

| | | | | |
|---|---|---|---|---|
| 4,565,915 A | * | 1/1986 | Girardin | 219/69.12 |
| 4,960,971 A | * | 10/1990 | Kawanabe | 219/69.12 |
| 5,243,165 A | * | 9/1993 | Hosaka | 219/69.12 |
| 6,103,987 A | * | 8/2000 | Nordquist | 219/69.12 |
| 6,246,024 B1 | * | 6/2001 | Hosaka | 219/69.12 |
| 6,486,429 B1 | * | 11/2002 | Wehrli et al. | 219/69.12 |

FOREIGN PATENT DOCUMENTS

JP         2002-46025 A   *   2/2002

* cited by examiner

*Primary Examiner* — Geoffrey S Evans
(74) *Attorney, Agent, or Firm* — WPAT, PC; Justin King

(57) ABSTRACT

A wire electrical discharge machine (WEDM) including a motion platform, a sink, a workbench, a connecting element, a jib, a first head and a second head is provided. The sink is disposed separately above the motion platform, and the workbench is disposed in the sink. The workbench is connected to the motion platform via the connecting element such that the motion platform drives the workbench moving along a first direction and a second direction. Besides, the jib is fixedly connected with the sink, and the first head is disposed inside the sink and connected with the jib. The second head is disposed above the first head. Thus, the jib does not cause relative motion to the sink in order to avoid leaking.

11 Claims, 7 Drawing Sheets

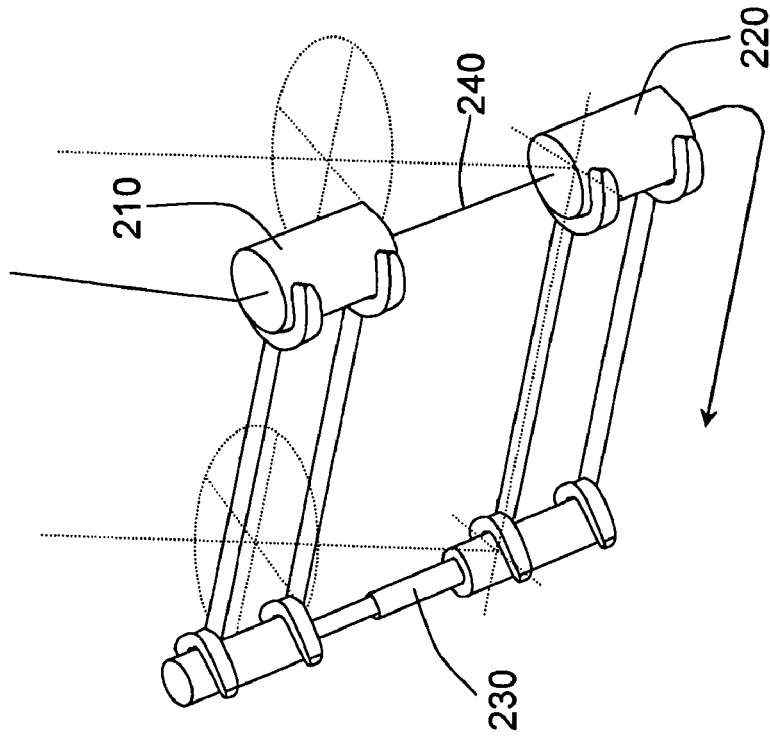
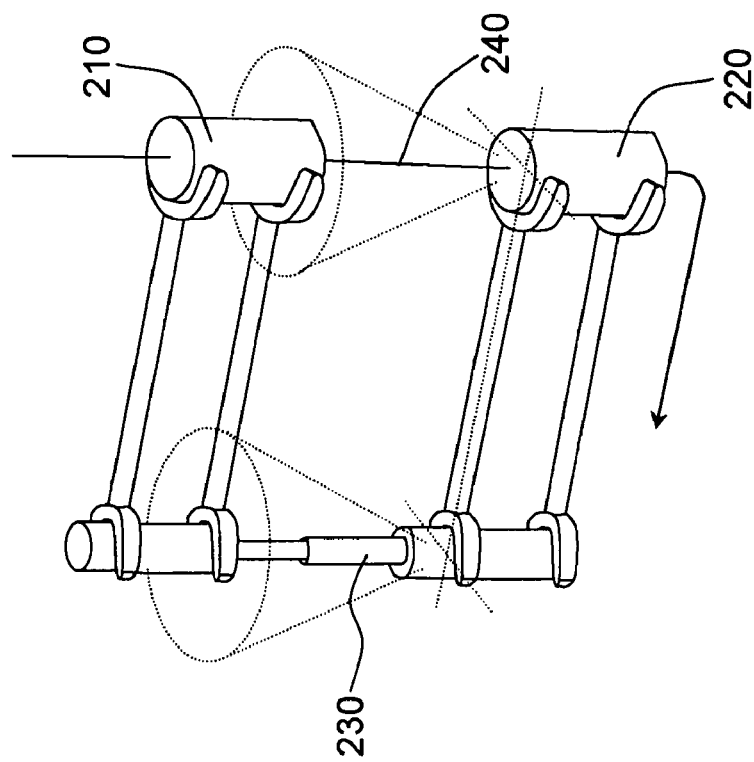

WIRE ELECTRICAL DISCHARGE MACHINING

FIELD OF THE INVENTION

The present invention relates to a wire electrical discharge machine (WEDM), and more particularly, to a WEDM capable of completely preventing leaking from happening.

BACKGROUND OF THE INVENTION

To implement a fully automated process for making high-precision product is becoming the focal point for any future machinery as such high-precision product is becoming more and more miniaturized. It is noted that in the foreseeable future, the crave for ultra precision dies or parts in industries, such as personal portable 3C products, optoelectronic communication and bio-medication, will be growing unstoppably and thus the implementations of the Micro System Technology (MST) for making such ultra precision products are developing rapidly. However, when it come to machine a ultra-precision product, the complexity as well as the design of the ultra-precision product is restricted by the precision of its machining process, that is, the capability of the machinery implementing the machining process. Therefore, until now, it is still a costly effort to integrate a variety of machining processes in an integration mechanism just for manufacturing a high-precision product.

The machining of wire electrical discharge machine (WEDM) is one of the most accurate non-conventional manufacturing processes available for creating complex or simple shapes or geometries within parts and assemblies. WEDM works by eroding material in the path of electrical discharges by forming an arc between a wire electrode and a work piece that it is freed from the problems troubled by those conventional cutting machinery, such as cutting stress and electrode wearing. WEDM manufacturing is a very desirable manufacturing process when it comes to cutting some of the hardest material used in the industries in high accuracy.

Please refer to FIG. 1A and FIG. 1B, which are respectively a three-dimensional view of a conventional wire electrical discharge machine and a partial view thereof. The conventional wire electrical discharge machine (WEDM) 100 of FIG. 1A comprises: a motion platform 110, a sink 120, a workbench 130, a jib 140, a lower head 150, an upper head 160, a column 170 and a motion module 180. In which, the motion module 180 further comprises: a horizontal moving unit 182, capable of moving on a surface defined by a Cartesian coordinate system of U-axis and V-axis whereas the U-axis and V-axis of the Cartesian coordinate system are parallel respectively to the X-axis and Y-axis of another Cartesian coordinate system defining the working surface of the motion platform; and a vertical moving unit 184, capable of moving along a Z-axis which is vertical to the two surfaces defined by the U-, V-axes and the X-, Y-axes. As shown in FIG. 1A, the sink 120 is mounted on the motion platform 110 so that it can be brought to move horizontally by the motion platform 110. Furthermore, the workbench 130 is configured inside the sink 120 that is used for securely fixing a workpiece thereon.

In FIG. 1A, the sink 120 is configured with an opening for the jib 140 to pass therethrough and into the sink 120. It is noted that the gap between the jib 140 and the sink is sealed by the use of a dynamic leak prevention device. Moreover, the two ends of the jib 140 are connected respectively to the lower head 150 and the column 170; and the upper head 160 is disposed at a position over the lower head 150 while enabling the motion module 180 to be disposed at a position between the upper head 160 and the column 170.

WEDM works by eroding material in the path of electrical discharges by forming an arc between a wire electrode 190 and a workpiece, and during the cutting, both the workpiece and the wire electrode 190 are submerged in the sink 120 where they are flushed by ionized water. Generally, the wire electrode 190 is disposed passing through the upper head 160 and the lower head 150 and then entering the jib 140 where it is guided toward the waste tank in the column 170, by that it is able to machine the workpiece continuously.

Moreover, in a machining operation, the jib 140, the lower head 150, the upper head 160 and the column 170 as well as the motion module 180 are all fixedly secured while adjusting the relative position of the workpiece with respect to the wire electrode 190 by the movement of the work platform 110 as the sink 120 is going to be move along with the moving of the work platform 110 and thus brought the workbench 130 as well as the workpiece disposed thereon to move correspondingly. It is noted that the horizontal moving unit 182 and the upper head can be moved for achieving machining angle adjustment or top and bottom different machining.

As the sink 120 is designed to move relative to the jib 140, it is important to configure a dynamic leak prevention device at the joint between the jib 140 and the sink 120 for preventing leakage. However, as the dynamic leak prevention device shall move along with the movement of the sink 120, the dynamic leak prevention device can in some ways resist the sink to move if it is designed to perform a strong seal by that the precision of the sink movement is uncontrollable and thus it is difficult to perform a precision machining upon the workpiece. On the other hand, if the seal is poor, the leaking of the ionized water is going to cause the WEDM 100 from working effectively. In addition, as the sink 120 is mounted on the work platform 110 and moved thereby, the weight of the sink 120 along with the ionized water filled therein will hamper the movement of the work platform 110 in a manner that the positioning accuracy of the work platform 110 is reduced, not to mention that it will require more power just for driving the work platform 110 to move.

Please refer to FIG. 2A and FIG. 2B, which are partial views of another convention wire electrical discharge machine operating in different machining angles while the WEDM is a wire-cut machine provided by Swiss AGIE company. For clarity, only the portion of the WEDM including its upper and lower hands and the connection arm are depicted. In FIG. 2A and FIG. 2B, the upper head 210, the lower head 220 and the connection arm 230 are integrated and assembled into the C-shaped structure 200 which can be suspended on top of the sink in a manner that it can be lowered and thus submerged in the water filled in the sink.

In the abovementioned WEDM, its wire electrode 240 is designed to follow the guidance of a channel formed in the connection arm into a waste tank by that the relative movement between the connection arm and the sink is prevented. However, by the use of the aforesaid C-shaped structure 200, the WEDM will require to be installed with many rollers for guiding its used wire electrode to maneuver around the sink so that it is not only technically more complex and difficult, but also is more costly for constructing the foregoing C-shaped structure 200.

SUMMARY OF THE INVENTION

The object of the present invention is to provide a wire electrical discharge machine (WEDM), adopting a design of arranging its sink separately from its motion platform in a manner that not only the relative displacement between the sink and the jib commonly seen in those conventional WEDMs is prevented so as to completely prevent leakage from happening, but also the power required for driving the motion platform is reduced and consequently the orientation accuracy of the motion platform is enhance since the sink is designed to be immobile.

To achieve the above object, the present invention provides a wire electrical discharge machine (WEDM), comprising: a motion platform, a sink, a workbench, a connecting element, a jib, a first head and a second head, wherein the motion platform is movable in a direction selected from the group consisting of a first direction and a second direction; the sink is disposed separately above the motion platform, and the workbench is disposed in the sink; the workbench, being disposed in the sink, is connected to the motion platform via the connecting element so as to be brought along to move by the motion platform; the jib is fixedly connected with the sink; and the first head is disposed inside the sink and connected with the jib while disposing the second head above the first head.

In an exemplary embodiment of the invention, the WEDM further comprises: a rack, for supporting the sink.

In an exemplary embodiment of the invention, the connecting element further comprises: a side stand and a cantilever; wherein the side stand is disposed on the motion platform while the cantilever is configured to connect the side stand with the workbench. In addition, the WEDM further comprises: a workpiece, capable of being disposed on the workbench.

In an exemplary embodiment of the invention, the first direction and the second direction are perpendicular to each other while both are arranged parallel to working surface of the WEDM.

In an exemplary embodiment of the invention, the sink is configured with an opening provided for the jib to pass therethrough and thus being fixedly secured to the sink. In addition, the sink and the jib can be integrally formed.

In an exemplary embodiment of the invention, the WEDM further comprises: a column and a motion module, in which the jib and the motion module are connected to the column while enabling the motion module to move in a first direction, a second direction and a third direction whereas the second head is connected to the motion module. In detail, the motion module includes a first motion unit and a second motion unit, in which the first motion unit, being connected to the second head, is adapted to move in the third direction; and the second motion unit, connecting to the first motion unit and the column, is adapted to move in the first and the second directions. Moreover, the first, the second and the third direction are arranged perpendicular to each other. In an embodiment, the first and the second direction are respectively being defined by a X-axis direction and a Y-axis direction of a Cartesian coordinate system while the third direction is being defined as a Z-axis diction of the Cartesian coordinate system.

To sum up, in the WEDM of the invention, the workbench is connected to the motion platform by the use of a connecting element for enabling the motion platform to be disposed separately from the sink, and thereby, when the workbench is being brought along to move by the motion platform, the sink will not be affected by the movement and thus remain immobile so that there is no relative movement between the jib and the sink for preventing leakage from happening.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 2A and FIG. 2B are partial views of another convention wire electrical discharge machine operating in different machining angle.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 3A:
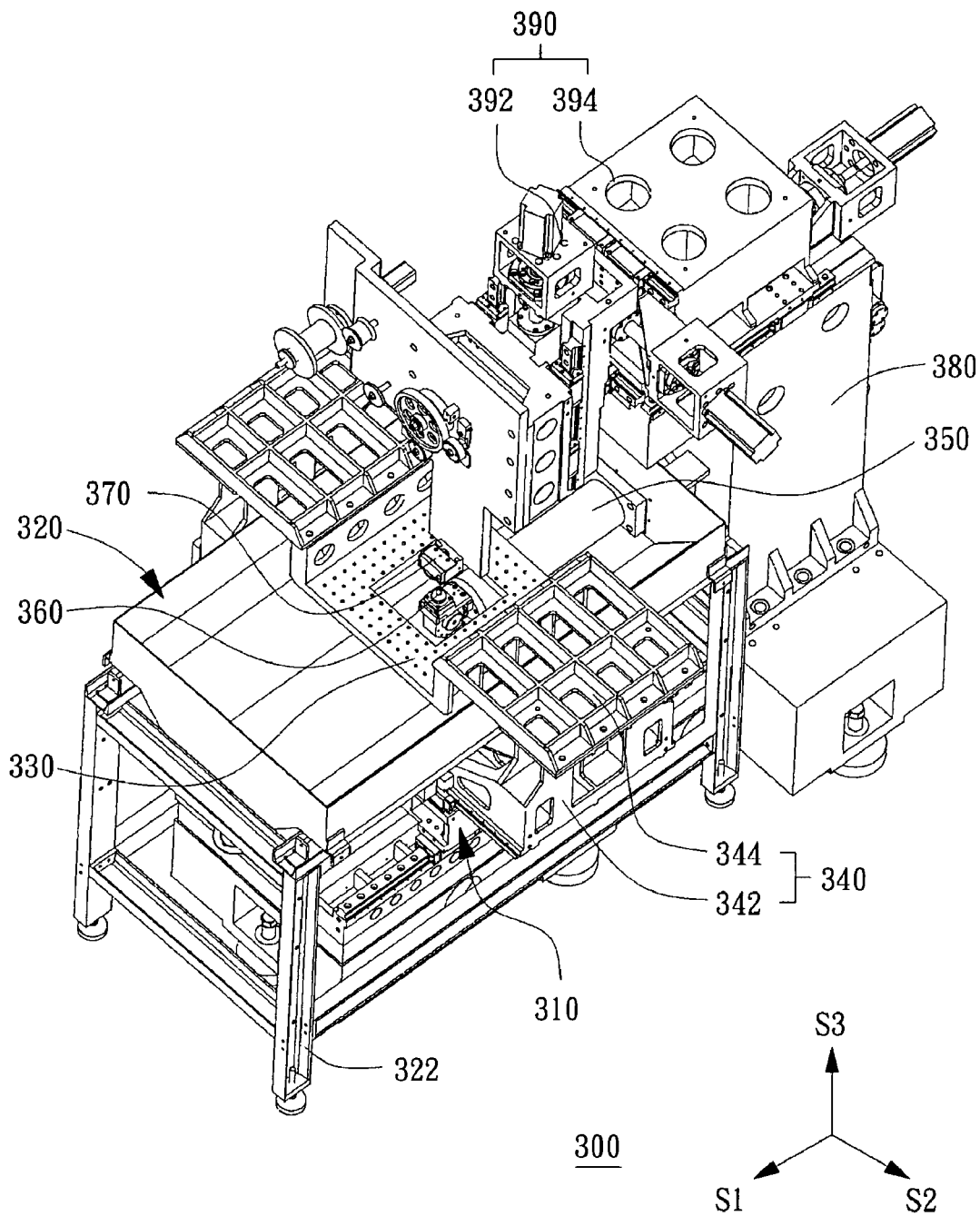
FIG. 3A is a three-dimensional view of a wire electrical discharge machine according to an exemplary embodiment of the invention.
Figure 3B:
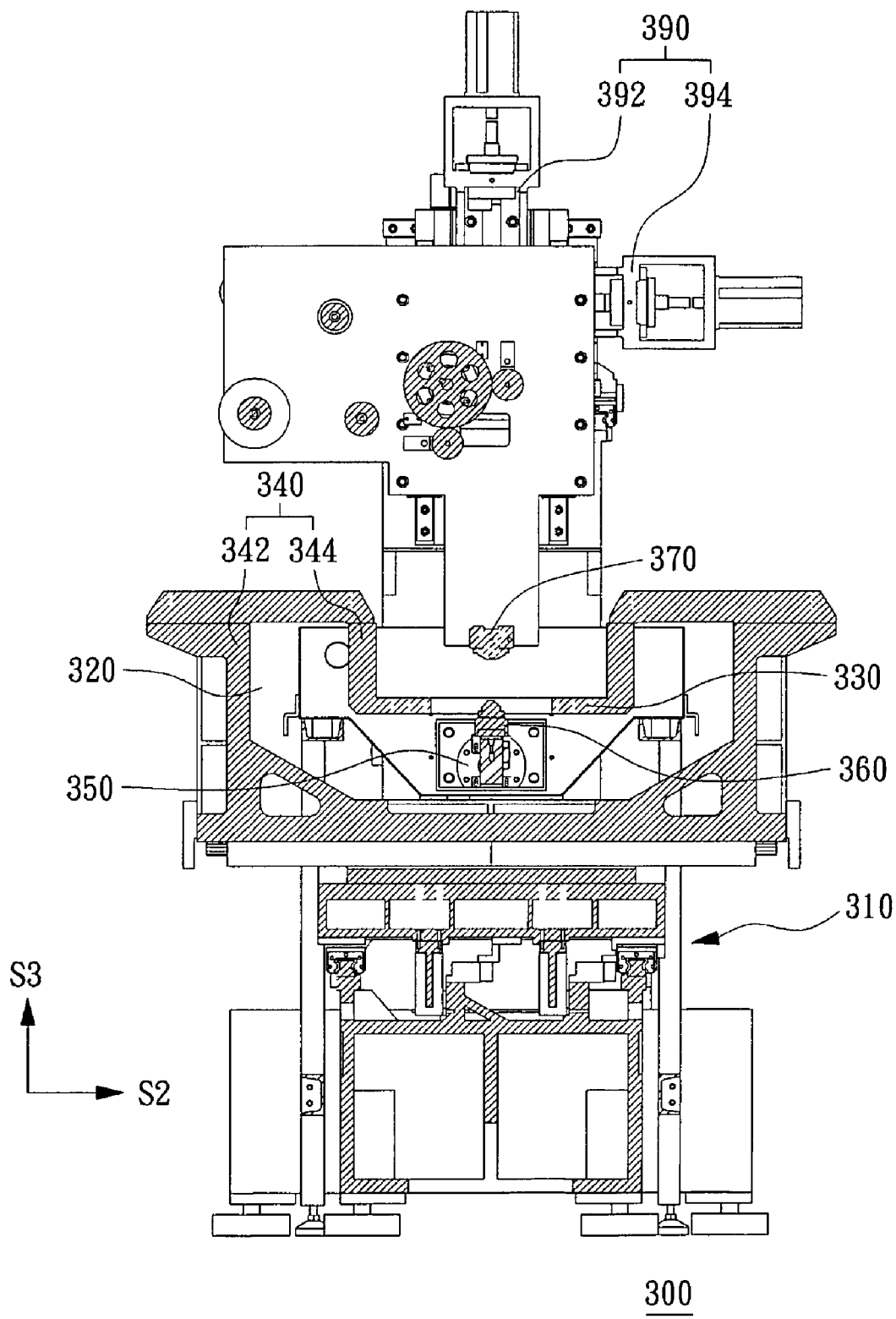
FIG. 3B is a front view of the WEDM shown in FIG. 3A.
Figure 3C:
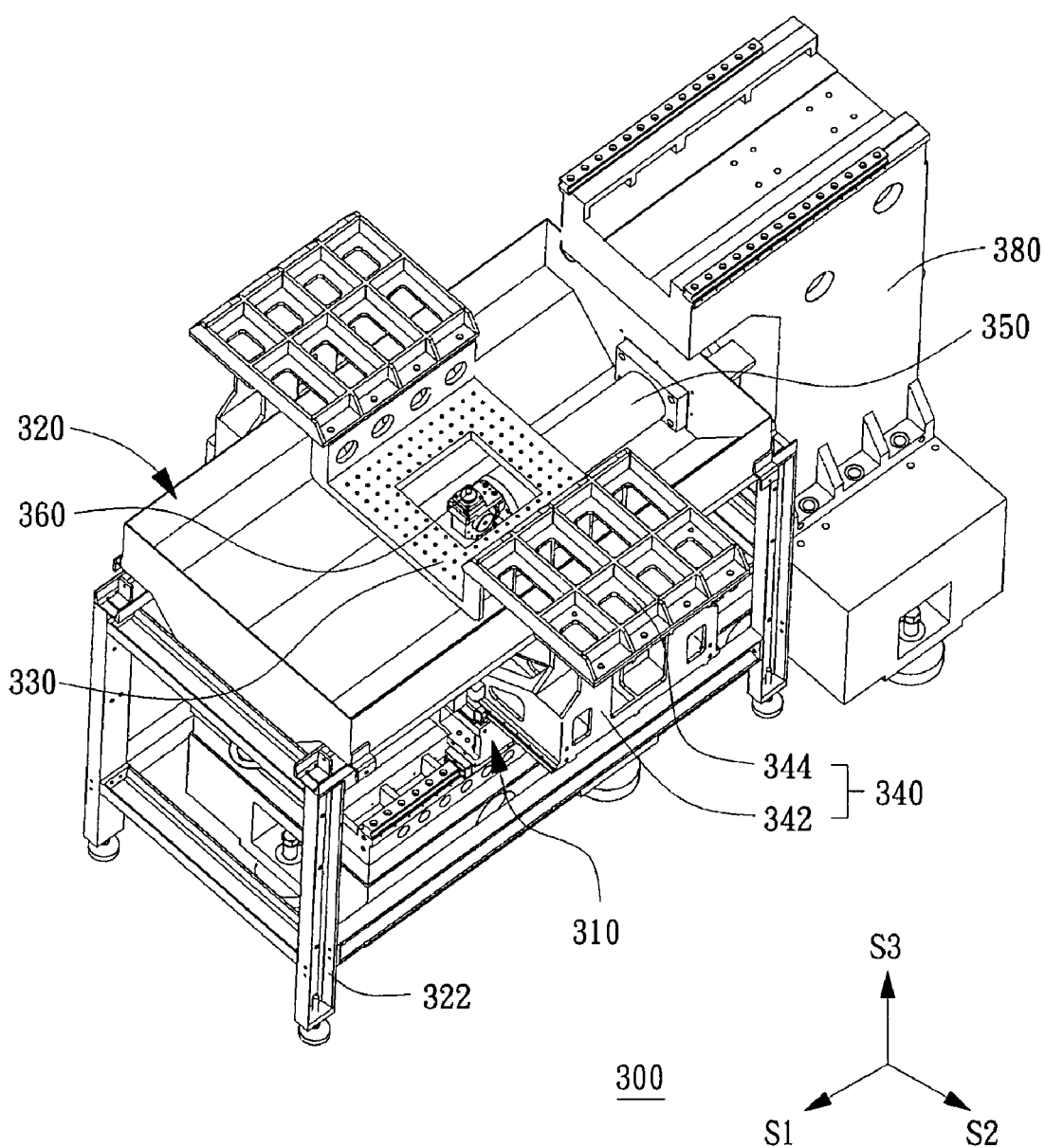
FIG. 3C is another three-dimensional view of the wire electrical discharge machine shown in FIG. 3A whereas some parts originally shown in FIG. 3A are removed.
Figure 3D:
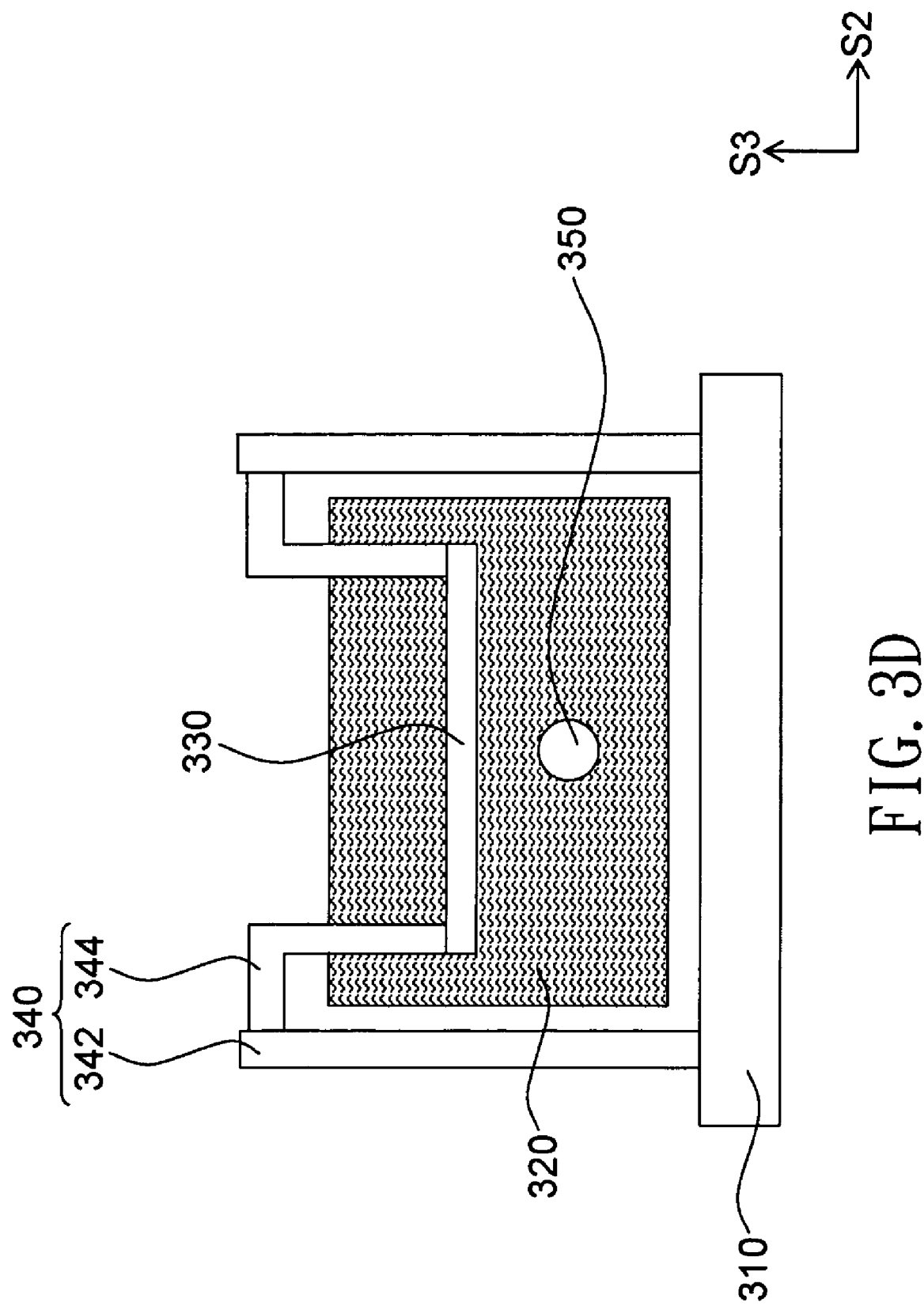
FIG. 3D is a schematic view of FIG. 3B.

FIG. 3A is a three-dimensional view of a wire electrical discharge machine according to an exemplary embodiment of the invention. FIG. 3B is a front view of the WEDM shown in FIG. 3A. FIG. 3C is another three-dimensional view of the wire electrical discharge machine shown in FIG. 3A whereas some parts originally shown in FIG. 3A are removed. FIG. 3D is a schematic view of FIG. 3B. As shown in FIG. 3A to FIG. 3D, the wire electrical discharge machine (WEDM) 300 is comprises of: a motion platform 310, a sink 320, a workbench 330, a connecting element 340, a jib 350, a first head 360 and a second head 370, in which the motion platform 310 is disposed separately from the sink 320 while being connected to the workbench 330 via the connecting element 340 for bringing along the workbench 330 to move in a first direction S1 and a second direction S2.

Moreover, the sink 320 is disposed above the motion platform 310 while receiving the motion platform 310 therein so that a portion of the connecting element 340 is received inside the sink 320. In addition, the jib 330 is fixedly secured to the sink 320 in a manner that a portion of the jib 330 where it is connected to the first head 360 is disposed inside the sink 320 and thus the first head 360 is being received inside the sink 320. Furthermore, the second head 370 is disposed at a position corresponding to the first head 360 that it is disposed above the first head 360.

While machining a workpiece placed on the workbench 330, a wire electrode will be feed continuously form the second head 370 to the first head 360 so as to erode material in the path of electrical discharges by forming an arc between the wire electrode and the workpiece, and during the cutting, both the workpiece and the wire electrode are submerged in the sink 320. Thereafter, the used wire electrode will be guided to the jib 330 and then enters a waste tank.

During the machining, the sink 320, the jib 350, the first head 360 and the second head 370 are all maintained stationary while using the movement of the motion platform 310 to bring along the workbench 330 to move correspondingly and thus bring the workpiece to move toward the wire electrode in different angles and positions for processing. Hence, as there is no relative motion between the sink 320 and the jib 350, the WEDM of the invention is able to function without the need to install the dynamic leak prevention device between the sink 320 and the jib 350 so that the overall cost for manufacturing the WEDM is reduced.

Moreover, by the configuration of invention, the integrate structure of the sink 320 and the jib 350 is seal completely that it can prevent any leakage from happening. In this embodiment, the sink 320 is configured with an opening which is provided for the jib 350 to pass therethrough and thus being fixedly secured to the sink 320. As the opening can be seal by the use of certain sealing material such as silicon gel, leakage can be avoided. Nevertheless, the connection of the sink 320 and the jib 350 is not limited by the foregoing description that the sink 320 and the jib 350 can be integrally formed as an integrated structure. Thus, the connection of the sink 320 and the jib 350 is dependent upon actual requirement.

Figure 1A:
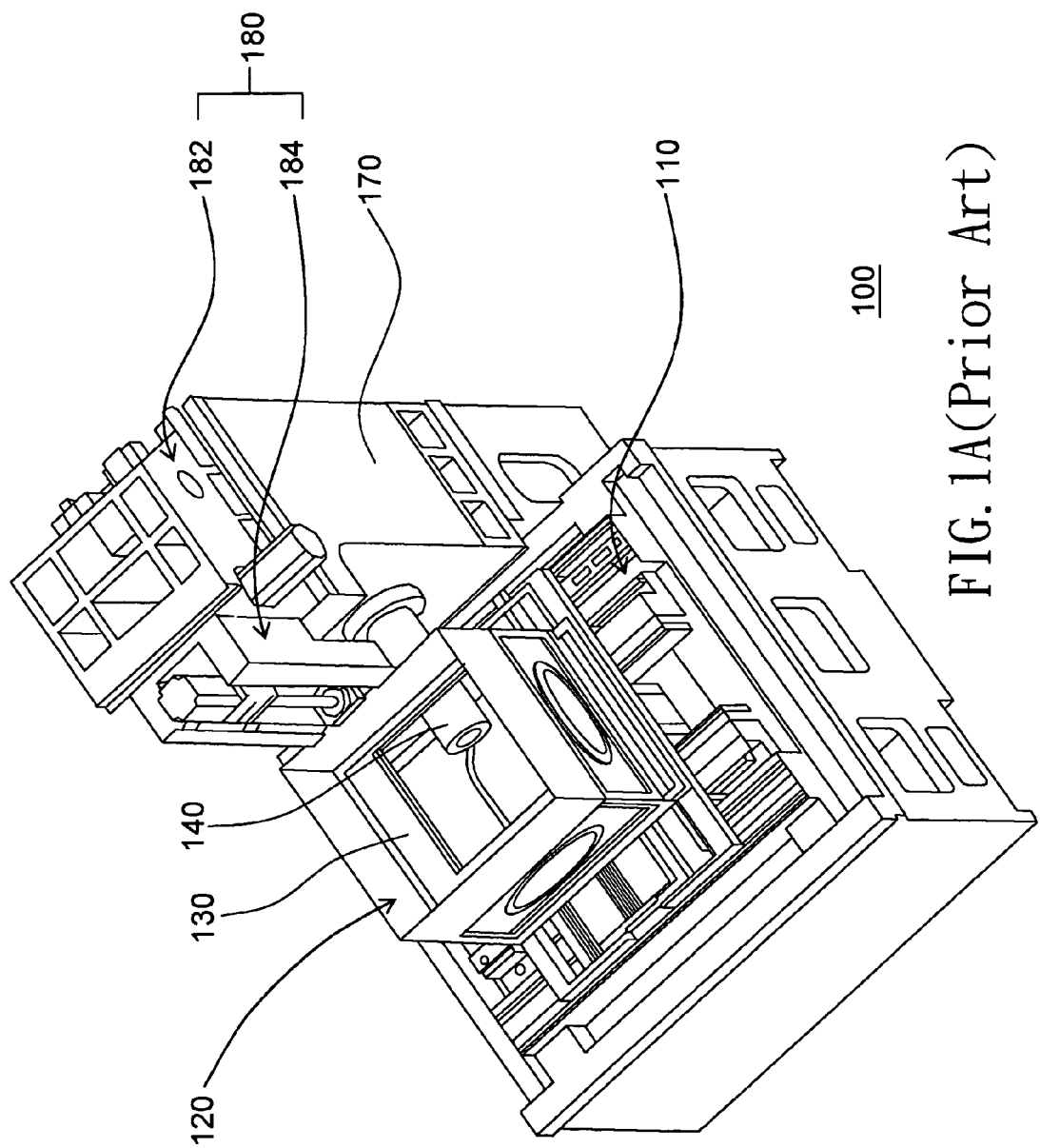
FIG. 1A and FIG. 1B are respectively a three-dimensional view of a conventional wire electrical discharge machine and a partial view of FIG. 1A.
Figure 1B:
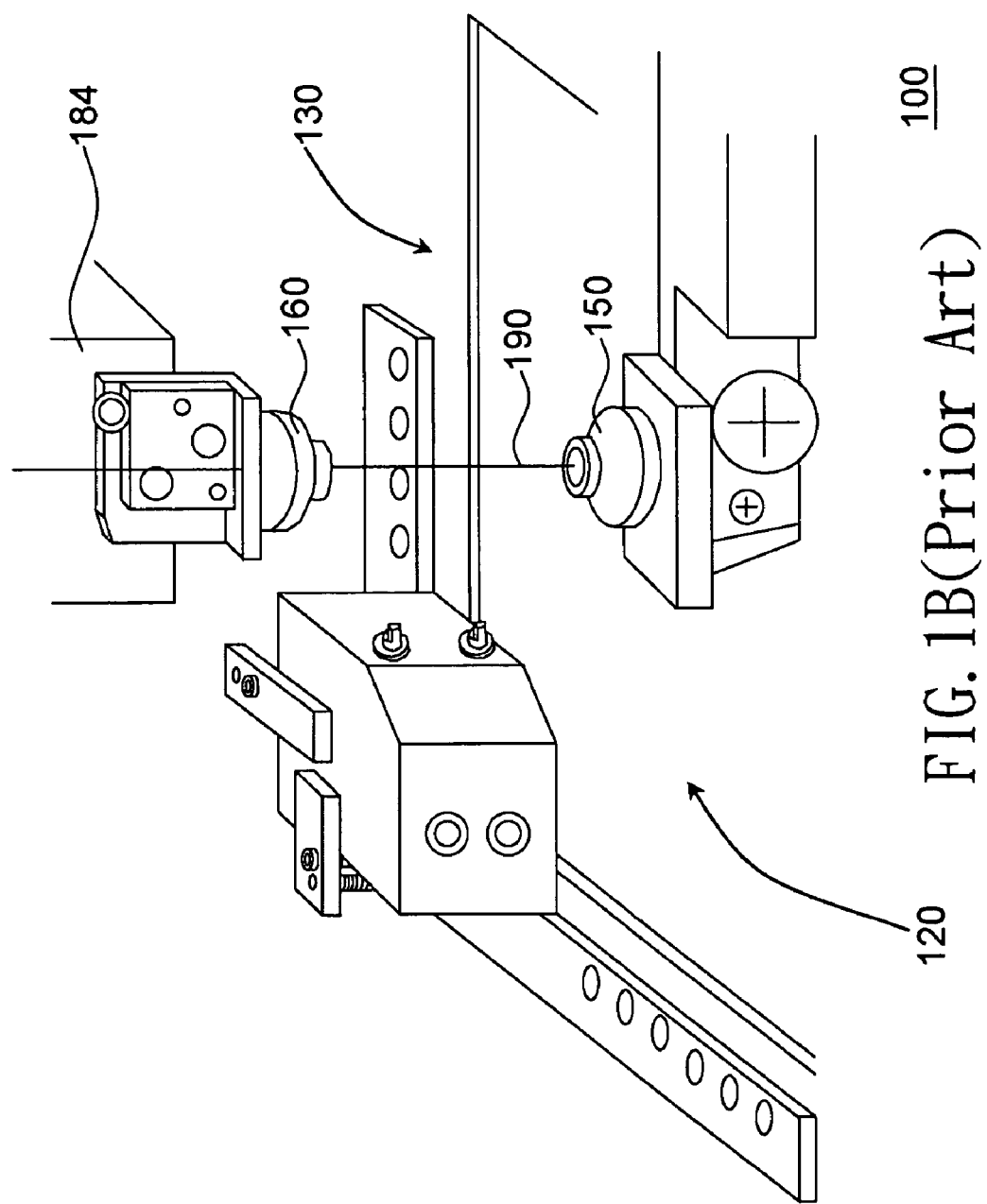

Comparing with the conventional motion platform shown in FIG. 1A and FIG. 1N that is designed to carry a sink to move and thus bring along the workbench to move in an indirect manner, the motion platform 310 is designed to directly drive the workbench 330 to move via the connecting element 340 so that the orientation accuracy of the motion platform 310 is enhance since the weight that is to be driven to move by the motion platform 310 is comparatively lighter than the prior art. Therefore, the WEDM of the invention is more suitable for machining nano-scale parts in high precision. In addition, comparing to the C-shaped structure shown in the WEDM of FIG. 2A and FIG. 2B, the wire electrode used in the WEDM of the invention is guided without the need of those complex rollers so that the manufacturing cost of the WEDM 300 is reduced.

In this embodiment, the motion platform 310 is used for bringing along the workbench 330 to move horizontally, that is, to move in a first direction S1 and a second direction S2 while the first direction S1 and a second direction S2 are arranged perpendicular to each other. To be more specific, the motion platform 310 is used for bringing along the workbench 330 to move on a surface defined by an X-, Y-axes of the Cartesian coordinate system as the first and the second direction are respectively being defined by the X-axis direction and the Y-axis direction of the Cartesian coordinate system.

As shown in FIG. 3A, the sink 320 is placed on a rack 322 in a manner that the two flanges of the sink 320 are supported by the two side bars of the rack 322 as the rack is a frame-like structure. Nevertheless, the rack 322 is not the necessity for the WEDM of the invention since the sink 322 can be configured with legs for standing on the ground on its own. Other modifications of the rack 322 is known to those skilled in the art and thus will not be described further herein.

In addition, the connecting element 340 can be an integrally formed device. In detail, the connecting element 340 can be divided into two parts which are a side stand 342, being fixedly connected to two side of the motion platform 310, and a cantilever 344, configured with an end connecting to the side stand 342 while connecting another end thereof to the workbench 330. With the aforesaid connecting element 340, the workbench 330 can be hung over the sink 320 while being submerge in the solution filled in the sink 320.

It is noted that as the objective of the invention is to use the connecting element 340 for enabling the motion platform 310 to drive the workbench 330 directly while preventing the sink 320 from being brought along to move by the motion platform 310. The aforesaid connecting element 340 is only for illustration which is not limited thereby, and thus modifications for the connecting element 340 can be achieved by those skilled in the art and are not to be regarded as a departure from the spirit and scope of the invention.

In FIG. 3A to FIG. 3D, it is noted that the relative positions and angles of the first head 360 and the second head 370 can be fine tuned for changing the cutting direction and angle of the wire electrode so as to achieve more precise machining in different machining angles. In detail, the WEDM 300 further comprises a column 380 and a motion module 390, in which the jib 350 and the motion module 390 are connected to the column 380 while connecting the motion module 390 to the second head 370 so that the second head 370 can be driven to move directly.

From the above description, the motion module 390 is able to drive the second head 370 to move in three directions. In an exemplary embodiment, the motion module 390 includes a first motion unit 382, being adapted to move in a third direction; and a second motion unit 394, being adapted to move in the first and the second directions S1, S2. That is, the first motion unit 392 is a vertical moving unit, capable of moving along a Z-axis of a Cartesian coordinate system while the second motion unit 394 is a horizontal moving unit, capable of moving on a surface defined by an U-, V-axes of the Cartesian coordinate system that are parallel respectively to the X-axis and Y-axis of another Cartesian coordinate system defining the working surface of the motion platform 310.

In detail, the first motion unit 392 is connected to the second head 370 for bringing along the second head 370 to move in the third direction S3 directly; and the second motion unit 394 is connected to the first motion unit 392 and the column 380 for bringing along the second head 370 to move in the first and the second directions S1, S2 indirectly. Thereby, the position and angle of the second head 370 in relative to the first head 360 can be adjusted for machining the workpiece in any angle and position in a precise manner.

Moreover, if the third direction is defined to be vertical to the ground, the first motion unit 392 is adapted to bring the second head 370 to move vertically. As the embodiment mentioned in the foregoing description, the first and the second direction are respectively being defined by a X-axis direction and a Y-axis direction of a Cartesian coordinate system while the third direction is being defined as a Z-axis diction of the Cartesian coordinate system, so that the first, the second and the third direction are arranged perpendicular to each other.

To sum up, the WEDM of the invention has advantages as following:
  (1) As the workbench in the WEDM of the invention is connected to its motion platform via the connecting element, its sink can be disposed separately from its motion platform so that the sink can remain immobile while the workbench is being driven to move by the motion platform for preventing leakage from happening since there is no relative displacement between the sink and the jib.
  (2) Since there is no relative displacement between the sink and the jib, those expensive dynamic leakage prevention device commonly seen in conventional WEDMs are not required so that the manufacturing cost is reduced. Moreover, the wire electrode used in the WEDM of the invention can be guided without the need of those complex rollers so that the manufacturing cost of the WEDM 300 is further reduced (3) As the motion platform of the invention is only used for driving the workbench directly and is relief from the duty of driving the hefty sink to move, machining accuracy is enhance greatly. On the other hand, under the same accuracy requirement, a motion platform with small power can be used in the WEDM for further reducing its manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wire electrical discharge machine, comprising:
a motion platform, being adapted to move in a first direction and a second direction;
a sink, being disposed separately above the motion platform;
a workbench, being disposed in the sink;
a connecting element, connecting the workbench to the motion platform for enabling the workbench to be brought along to move by the motion platform independently of the sink;
a jib, fixedly secured to the sink;
a first head, disposed in the sink while being connected to the jib; and
a second head, being disposed above the first head.

2. The wire electrical discharge machine of claim 1, further comprising:
a column, provided for the jib to connected thereto; and
a motion module, provided for the second head to connected thereto while enabling the motion module to move in the first direction, the second direction and a third direction.

3. The wire electrical discharge machine of claim 2, wherein the motion module further comprises:
a first motion unit, being connected to the second head while being adapted to move in the third direction; and
a second motion unit, connecting to the first motion unit and the column while being adapted to move in the first and the second directions.

4. The wire electrical discharge machine of claim 3, wherein the first motion unit is a vertical moving unit, capable of moving along a Z-axis of a Cartesian coordinate system while the second motion unit is a horizontal moving unit, capable of moving on a surface defined by an U-, V-axes of the Cartesian coordinate system.

5. The wire electrical discharge machine of claim 2, wherein the first, the second and the third direction are arranged perpendicular to each other.

6. The wire electrical discharge machine of claim 1, wherein the sink is configured with an opening provided for the jib to pass therethrough and thus being fixedly secured to the sink.

7. The wire electrical discharge machine of claim 1, further comprising:
a rack, for supporting the sink.

8. The wire electrical discharge machine of claim 1, wherein the connecting element further comprises:
a side stand, disposed on the motion platform; and
a cantilever, being configured to connect the side stand with the workbench.

9. The wire electrical discharge machine of claim 1, wherein the first direction and the second direction are perpendicular to each other.

10. The wire electrical discharge machine of claim 1, further comprising:
a workpiece, being disposed on the workbench.

11. The wire electrical discharge machine of claim 1, wherein the sink and the jib can be integrally formed.

* * * * *